United States Patent
de Kock et al.

(10) Patent No.: US 6,345,753 B1
(45) Date of Patent: Feb. 12, 2002

(54) VERTICAL BELT STORAGE SYSTEM

(75) Inventors: Peter de Kock, Oberhausen; Ralf-Hartmut Sohl, Solingen; Christoph Diekmann, Oberhausen; Uwe Bachmann, Dinslaken, all of (DE)

(73) Assignee: SMS Schloemann-Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 09/647,774

(22) PCT Filed: Apr. 7, 1999

(86) PCT No.: PCT/EP99/02341

§ 371 Date: Jan. 2, 2000

§ 102(e) Date: Jan. 2, 2000

(87) PCT Pub. No.: WO99/52804

PCT Pub. Date: Oct. 21, 1999

(30) Foreign Application Priority Data

Apr. 9, 1998 (DE) ......................................... 198 16 057

(51) Int. Cl.[7] ............................................. B65H 20/30
(52) U.S. Cl. .................................. 226/118.2; 242/417.2
(58) Field of Search .......................... 226/118.1, 118.2, 226/118.3; 242/417.2

(56) References Cited

U.S. PATENT DOCUMENTS

| | | | | | |
|---|---|---|---|---|---|
| 1,637,892 A | * | 8/1927 | Benner et al. | ......... | 226/118.2 X |
| 2,050,053 A | * | 8/1936 | Graf et al. | ............ | 242/417.2 X |
| 2,771,984 A | * | 11/1956 | Ranney | ................ | 226/118.2 X |
| 2,925,270 A | * | 2/1960 | Hollis | .................. | 226/118.3 X |
| 3,051,362 A | * | 8/1962 | Shook | .................. | 226/118.2 X |
| 3,414,208 A | | 12/1968 | Butler et al. | | |
| 3,645,463 A | * | 2/1972 | Helm | .......................... | 242/552 |
| 3,669,375 A | * | 6/1972 | Bruton | ..................... | 242/417.2 |
| 3,841,545 A | | 10/1974 | Gingher, Jr. | | |
| 3,918,655 A | * | 11/1975 | Hillner et al. | ........... | 242/417.2 |
| 4,262,855 A | * | 4/1981 | Haag | .......................... | 242/552 |

FOREIGN PATENT DOCUMENTS

| | | |
|---|---|---|
| DE | 295 21 303 U1 | 1/1997 |
| EP | 0773074 | 5/1997 |
| EP | 0844204 | 5/1998 |

OTHER PUBLICATIONS

Stahl und Eisen (103) 1983, No. 9, pp. 435–440.

* cited by examiner

Primary Examiner—Michael R. Mansen
(74) Attorney, Agent, or Firm—Friedrich Kueffner

(57) ABSTRACT

A vertical strip storage system has a support structure and a storage car connected to the support structure by cables in the fashion of a pulley block so as to be lifted and lowered relative to the support structure. The storage car is provided with a counterweight and with deflection pulleys which deflect and guide an incoming and/or outgoing strip in cooperation with stationary deflection pulleys on the ground. The support structure is a free-standing column without lateral supports and the storage car is a salient vehicle running on the outer surface of the column, wherein the column has an interior and the counterweight is guided in the interior of the column.

3 Claims, 3 Drawing Sheets

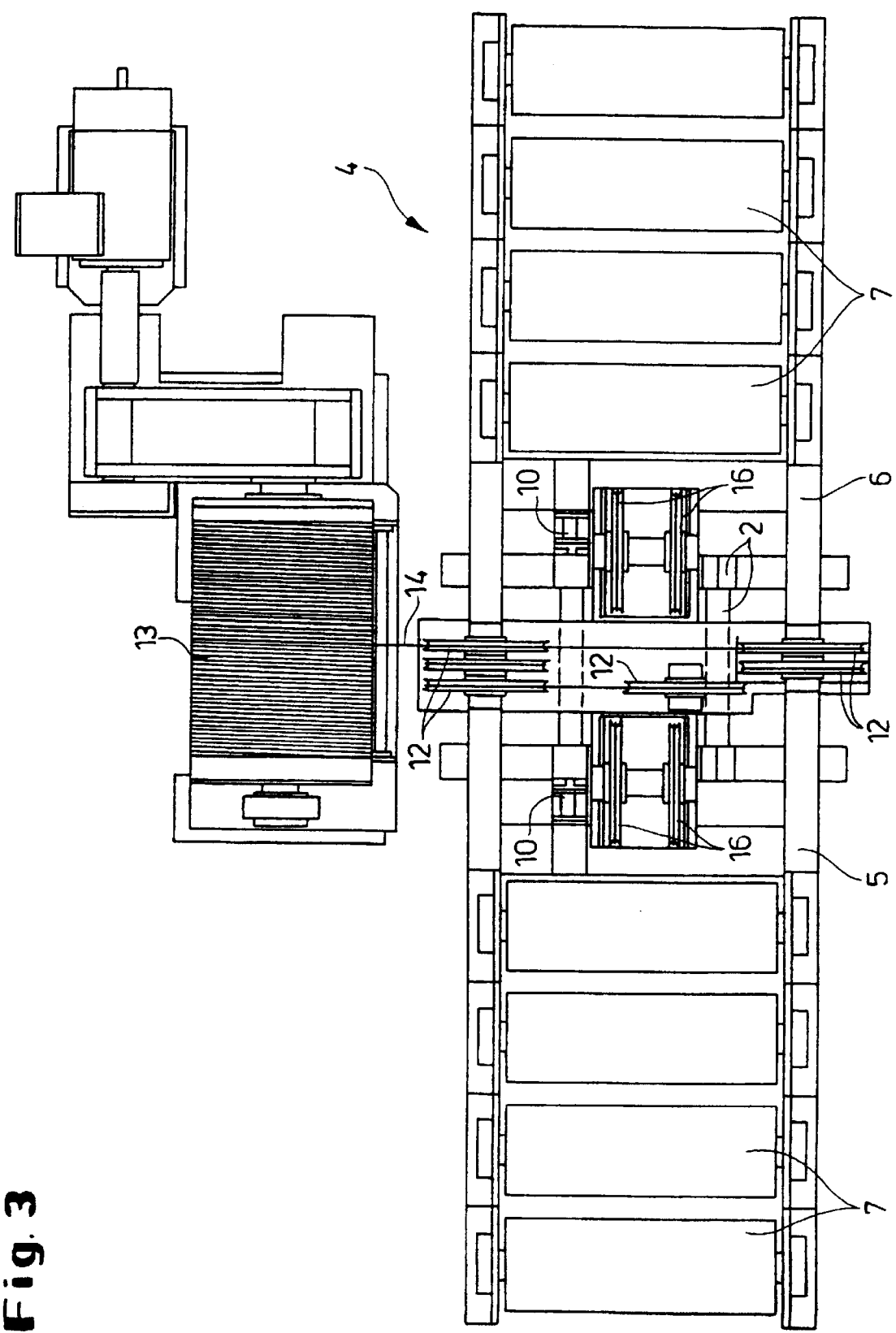

VERTICAL BELT STORAGE SYSTEM

BACKGROUND OF THE INVENTION

1. Field of the Invention

The invention relates to a vertical strip storage system, comprising a support structure for a storage car, which can be lifted and lowered by cables in the fashion of a pulley block and is provided with a counterweight, wherein the storage car is provided with deflection pulleys which deflect and guide the incoming and/or outgoing strip in cooperation with stationary deflection pulleys provided on the ground.

2. Description of the Related Art

In strip treatment devices, such as, for example, disclosed in the journal "Stahl u. Eisen 103 (1983) No. 9, pages 435–440" for use with a combined continuous annealing and treatment device for cold rolled strip, such strip storage systems are used for bridging the downtime of the inlet and the outlet portion of the device. They are capable of receiving a strip or a strip supply by loop formation in order to make a continuous working treatment part possible during strip changes in the inlet part and the outlet parts. A differentiation is made between, on the one hand, so-called horizontal storage systems and, on the other hand, so-called vertical storage systems or vertical loop storage systems.

The aforementioned vertical storage systems are conventionally embodied in a steel support structure similar to a winding tower; the movable storage car is guided within the support structure, i.e., it is supported with guides on the inner side of the tower. The counterweights are arranged externally. This known steel support structure requires a relatively heavy and bulky construction because of the unfavorable force introduction for the storage car, the car drive, and the guiding of the counterweights.

SUMMARY OF THE INVENTION

It is an object of the invention to design a vertical strip storage system according to the aforementioned kind in a simpler and more expedient way.

This object is solved according to the invention in that the support structure is a column and the storage car is a salient vehicle running along its outer surface. This makes possible a very compact embodiment of the vertical storage system, moreover in connection with a considerable manufacturing advantage because the column can be pre-manufactured and aligned in the manufacturer's workshop. This shortens the assembly time in comparison to a conventional strip storage system. Moreover, the storage car with diametrically positioned salient frames, i.e., designed to project on both sides, can be changed by simple adaptations such that the vertical storage system can be changed with regard to its capacity as desired, which is not possible in the known vertical storage systems because of their closed construction. This is so because, according to the invention, the number of deflection pulleys arranged on the salient frames can be increased or reduced by a simple expansion or shortening of the frame construction without affecting the running properties or having to change the guides. The latter are positioned at the sides remote from the cantilevered ends of the storage car which is guided on the outer surfaces of the column.

One embodiment of the invention provides that the counterweight is guided in the interior of the column. The column according to the invention thus provides moreover the possibility of integrating all essential functional elements of the vertical storage system, for example, also receiving the required service elevator. This holds true also for the known prior art strip center control important for the function of the vertical storage system and advantageously arranged on the foot of the column.

BRIEF DESCRIPTION OF THE DRAWINGS

Further features and advantages of the invention result from the claims and the following description in which one embodiment of the subject matter of the invention is explained in more detail. It is shown in:

FIG. 3 a plan view of the FIG. 1 on an enlarged scale.

DESCRIPTION OF PREFERRED EMBODIMENTS

Figure 1:
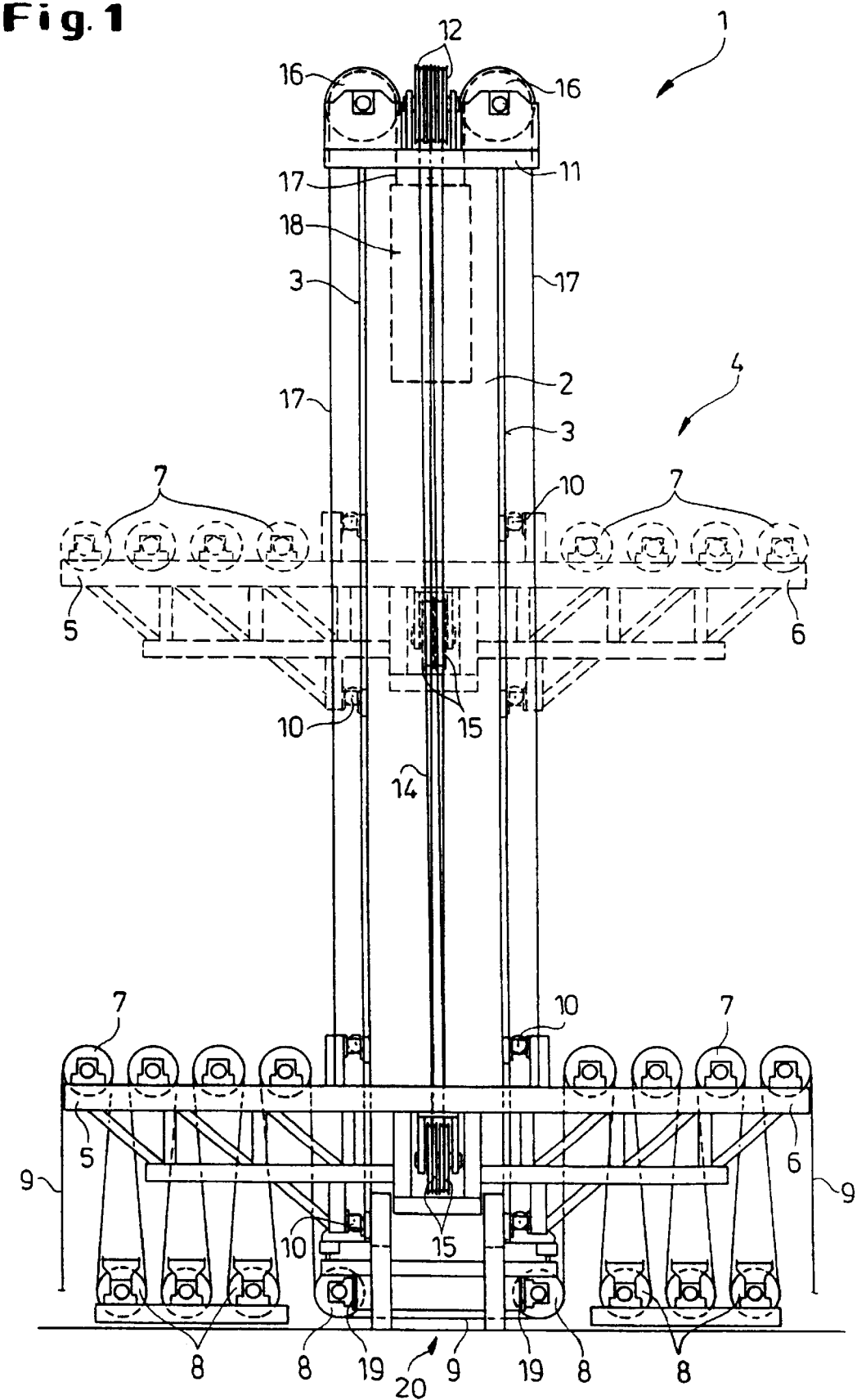
FIG. 1 a front view, partly shown in section, of a vertical strip storage system in the form of a column with a storage car movable along the outer side.

According to FIG. 1, a vertical strip storage system 1 arranged within a strip treatment device, not illustrated in more detail, has a column 2 as a support structure. At its outer surfaces 3 two salient frames 5, 6, diametrically oppositely arranged, are provided and form a liftable and lowerable storage car 4. In the illustrated embodiment, they are provided each with four deflection pulleys 7 about which, in cooperation with stationary deflection pulleys 8 on the ground, a strip 9 to be stored is guided in loops. The storage car 4, respectively, the two salient frames 5 are supported via guides 10 (see also FIG. 3) on the outer surfaces 3 of the column 2.

Figure 2:
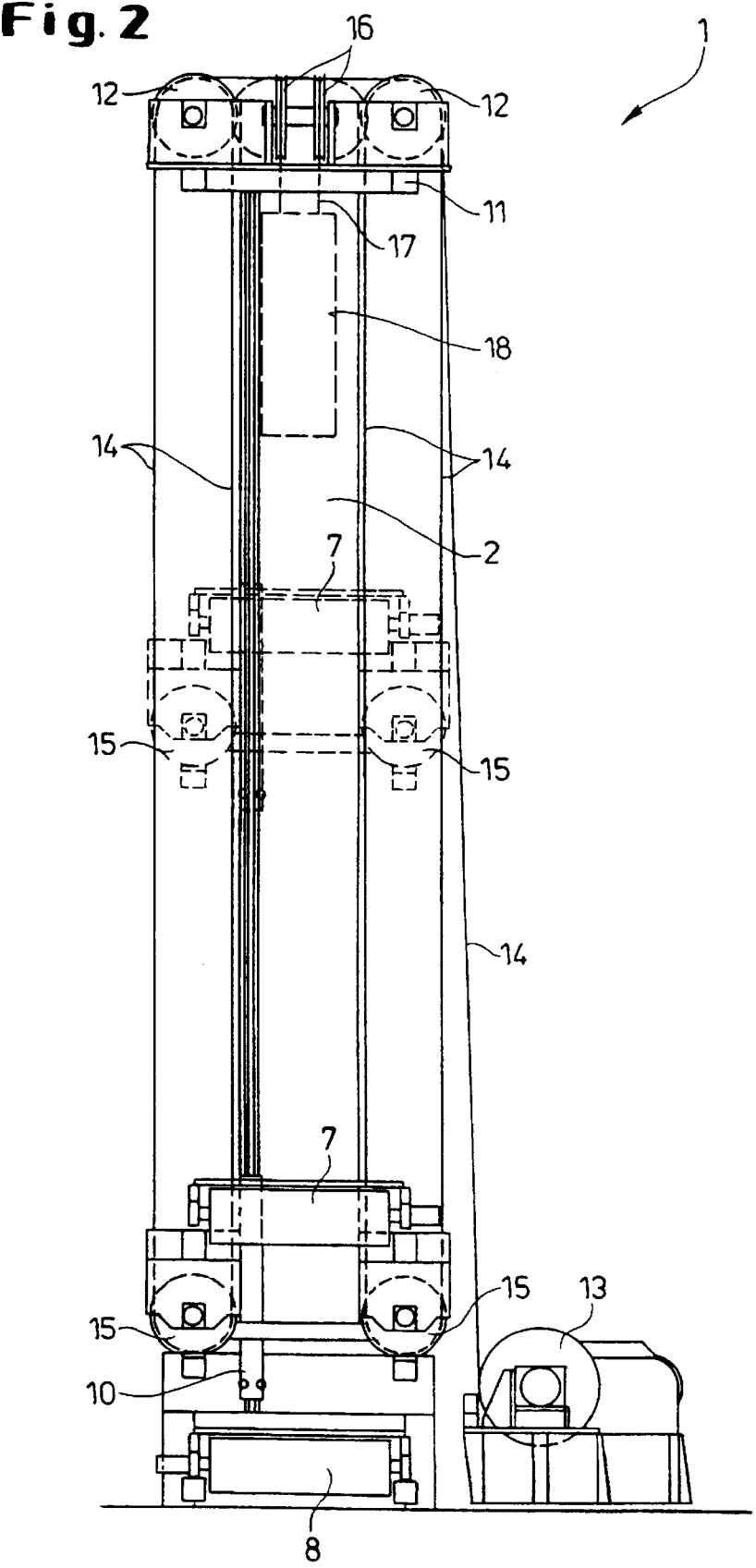
FIG. 2 the vertical strip storage system according to FIG. 1 in a side view.

On the one hand, several cable pulleys 12 are arranged on a platform 11 of the column 2 provided at the column head like a pulley block for a cable 14 of the pulley block extending from a motor-driven winch 13 (see FIGS. 2 and 3), and they cooperate with loose deflection pulleys 15 of the storage car 4. By actuating the winch 13 the storage car 4 is thus lifted or lowered and pulls larger or smaller loops in accordance with the desired or required storage supply. An intermediate position, illustrated without the pulled loops for simplifying the drawing, of the storage car 4 is shown in dashed lines in FIGS. 1 and 2. On the other hand, cable pulleys 16 for a counterweight 18, illustrated in FIGS. 1 and 2 in dashed lines, are arranged on the platform 11, the counterweight compensating the own weight of the storage car 4 and being fastened on cables 17 and guided in the interior of the column 2. The strip center control 19 required for the function of the vertical strip storage system 1 is arranged according to FIG. 1 in or on the column foot 20.

The vertical storage system 1, comprising the central column 2 for the storage car 4 guided externally thereon, can be completely assembled as well as aligned in the workshop of the manufacturer, which facilitates and shortens its later installation. In addition to the simple and space-saving guiding of the counterweight 18 in the interior of the column 2, the outwardly exposed salient frames 5, 6 not only provide an unhindered, free access to the deflection pulleys 7 but at the same time it is also possible in a simple manner to increase the storage capacity by means of the frames 5, 6 of the storage car 4 being extended farther outwardly and having a correspondingly large number of deflection pulleys 7.

What is claimed is:

1. A vertical strip storage system, comprising a support structure and a storage car connected to the support structure by cables in the fashion of a pulley block so as to be lifted and lowered relative to the support structure, wherein the storage car is provided with a counterweight and with deflection pulleys which deflect and guide an incoming and/or outgoing strip in cooperation with stationary deflection pulleys on the ground, wherein the support structure is a free-standing column (2) without lateral bracing and the storage car (4) is a salient vehicle running on the outer surface (3) of the column, wherein the column (2) has an interior and the counterweight (18) is guided in the interior of the column (2).

2. The vertical strip storage system according to claim 1, further comprising a strip center control, wherein the column (2) has a column foot (20) and wherein the strip center control (19) is arranged on the column foot (20).

3. The vertical strip storage system according to claim 1, wherein the storage car (4) has diametrically opposed salient frames (5, 6).

* * * * *